Dec. 13, 1966   F. V. McCAY, JR   3,290,960
DETENT MECHANISM
Filed Dec. 15, 1964                       2 Sheets-Sheet 1

INVENTOR
FRANK V. McCAY JR.

BY  Stowell & Stowell
ATTORNEYS

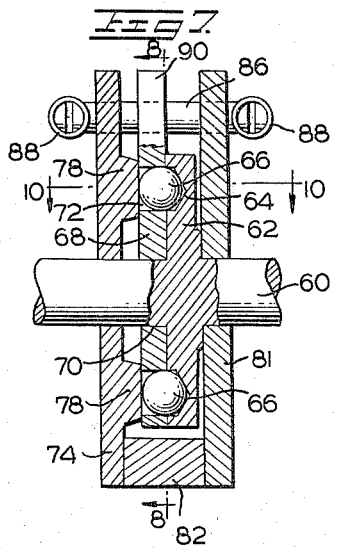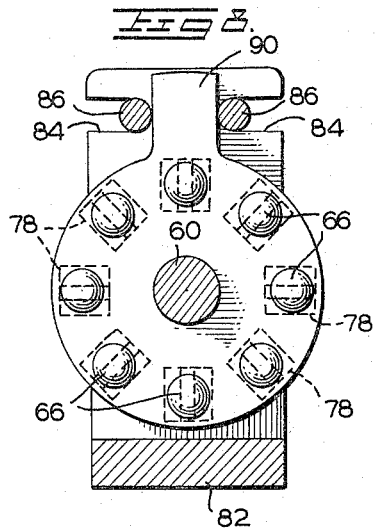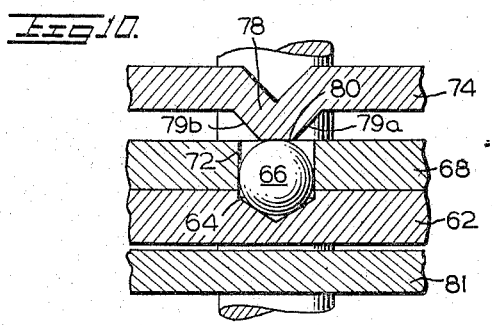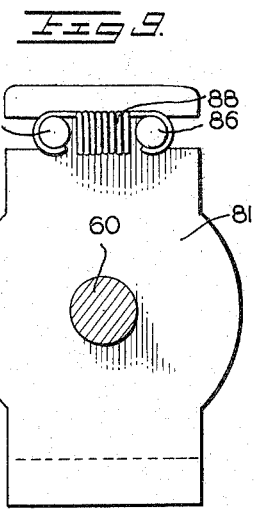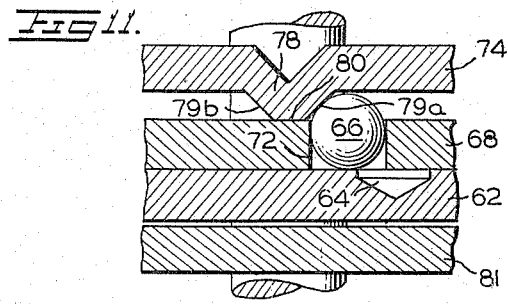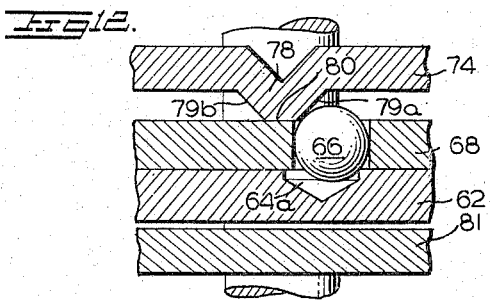
INVENTOR
FRANK V. McCAY JR.
BY Stowell & Stowell
ATTORNEYS United States Patent Office 3,290,960
Patented Dec. 13, 1966

3,290,960
DETENT MECHANISM
Frank V. McCay, Jr., 1376 Logan Ave.,
Salt Lake City, Utah
Filed Dec. 15, 1964, Ser. No. 418,507
11 Claims. (Cl. 74—527)

This invention relates to detent mechanisms for shafts adapted to assume a discrete one of a plurality of positions.

According to one embodiment of the present invention, a detent assemblage comprises a shaft adapted to execute longitudinal motion and provided with a plurality of annular grooves on the periphery thereof with each groove being adapted to successively receive a plurality of ball elements with changes in axial position of the shaft. According to this embodiment, changes in the axial position of the shaft are yieldably opposed by a pair of springs which may have the same or different spring constants to effect, in the latter case, a greater ease in moving the shaft in one axial direction than in the opposite axial direction.

According to a second embodiment of the invention, a rotatable shaft is to be positioned in one of several discrete angular positions and rotation of the shaft is opposed by yielding spring members.

In the drawings:

FIG. 1 is a cross-sectional view of one embodiment of the invention showing a shaft which is adapted to be placed in one of three axial positions, the detent assemblage being shown as part of a hydraulic control valve, such as illustrated in my copending application Serial No. 348,044, filed February 28, 1964;

FIGS. 2-6, inclusive, are partial views similar to FIG. 1 showing the cooperation of the various elements as the shaft is changed from one axial position to another;

FIG. 7 is a cross-sectional view of a second embodiment of this invention as applied to a shaft adapted to execute angular displacements and to be positioned in one of a plurality of discrete angular states;

FIG. 8 is a view taken along line 8—8 of FIG. 7;

FIG. 9 is an end elevational view of the device shown in FIG. 7;

FIG. 10 is a partial view taken along line 10—10 of FIG. 7 and shows the nodule and ramp in detail;

FIG. 11 is a view similar to FIG. 10 showing the change in position of certain elements of FIG. 10 after a slight rotation of the shaft; and FIG. 12 is a view similar to FIG. 11 showing conditions immediately prior to the next detent position.

Figure 1:
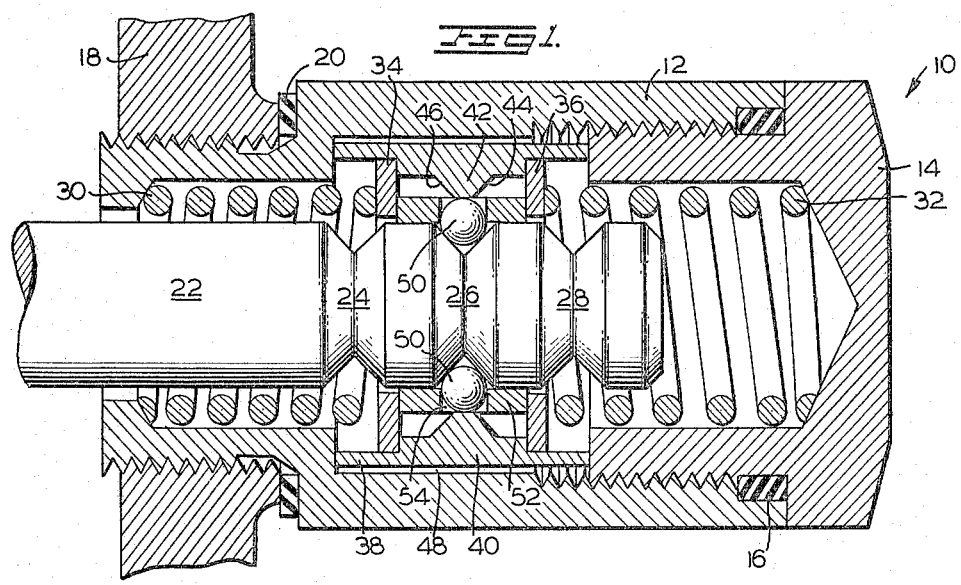

Referring now to FIG. 1 of the drawings, the numeral 10 denotes generally the detent mechanism of one embodiment of the invention and includes sleeve 12 internally threaded at one end and an externally threaded end cap 14. A seal 16 is provided between sleeve 12 and the end cap. The other end of sleeve 12 is externally threaded and is received in wall section 18 of, for example, a hydraulic control valve. The numeral 20 denotes a sealing washer placed between an abutment surface of sleeve 12 and the illustrated wall portion 18 of the hydraulic control valve.

The numeral 22 denotes a control shaft adapted to execute longitudinal motion and is provided with a plurality of axially spaced grooves denoted by the numerals 24, 26 and 28, each having a surface in the general form of a V. Compressional coil springs 30 and 32 are positioned within the interior of sleeve 12 and the end closure cap 14, respectively, and their opposed ends abut, respectively, washers 34 and 36. The numeral 38 denotes a race sleeve having a thickened mid-portion 40. In the illustrated position, it will be observed that washers 34 and 36 bear against the abutment defined by the radially inwardly extending portions of thickened portion 40. The numeral 42 denotes an annular rib, integrally formed with race sleeve 34, having a flattened portion at the innermost part thereof defining a continuous abutment surface and includes sloping sides 44 and 46. It will be observed that the sloping sides 44 and 46 are substantially parallel to the sloping V-shaped sides of the annular grooves 24, 26 and 28.

The numeral 48 denotes a clearance between the internal portion of sleeve 12 which receives race sleeve 38 and the exterior surfaces of the race sleeve. This clearance permits slight motion of the race sleeve relative to the sleeve 12 thereby compensating for manufacturing tolerances of the components.

The numeral 50 denotes any one of a plurality of balls positioned, at FIG. 1, around the shaft 22 and in groove 26. A detent sleeve 52 is provided with a plurality of circumferentially spaced apertures 54 whose diameters are at least as great as the diameter of the balls 50. The ends of sleeve 52 are abutted by washers 34 and 36 when the sleeve is in a neutral position as illustrated in, for example, FIG. 1 of the drawings.

Reference will now be made to FIGS. 2-6, inclusive, which illustrate the cooperation of the elements forming the detent assembly as the shaft 22 is moved from the illustrated position of FIG. 1 to another discrete axial position.

Figure 2:
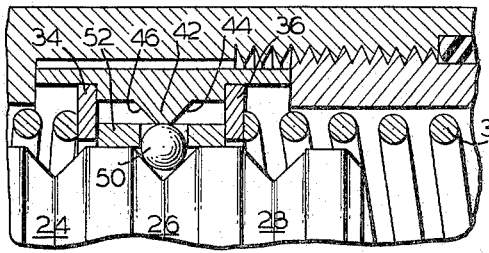
Figure 3:
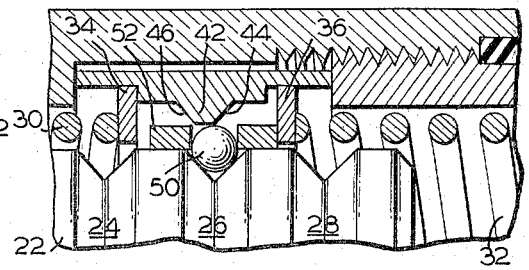

FIG. 2 is a view substantially similar to FIG. 1 and shows only a portion thereof as are FIGS. 3-6, inclusive. Referring now to FIG. 2, it will be seen that the position of control shaft 22 is such that the balls 50 are resting in annular groove 26. FIG. 3 represents the position of shaft 22 after it has been moved slightly to the right and it is seen that ball 50 has urged detent sleeve 52 towards the right, in turn urging washer 36 also to the right against the force of spring 32.

Figure 4:
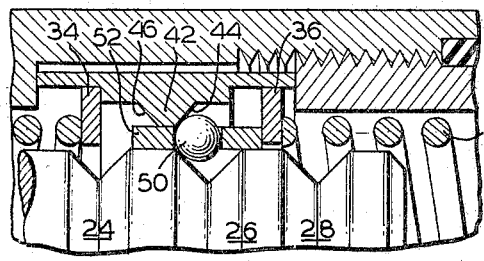

At FIG. 4 of the drawings, the left-hand side of groove 26 has pushed ball 50 further to the right and consequently up and partially out of groove 26. It will be observed that as the ball 50 moves out of groove 26, it is executing rolling contact with respect to the left surface of groove 26 and surface 44 of rib 42.

Figure 5:
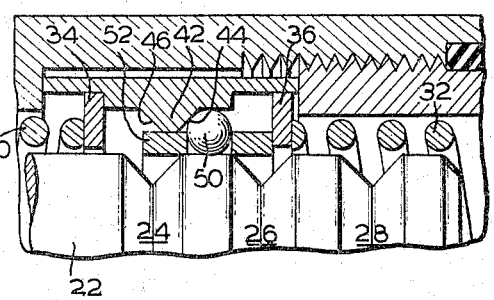

At FIG. 5 of the drawings, ball 50 has moved entirely out of groove 26 thereby allowing the land portion of shaft 22 between grooves 26 and 24 to pass by the balls. In this connection, it is important that the diameter of the balls 50 be slightly less than the distance between the land of shaft 22 and the radially inwardly extending portions of thickened portion 40 of the race sleeve 38. This insures free movement of the shaft 22 at minimum friction. Washer 36 has now moved to its extreme right position against the force of spring 32.

Figure 6:
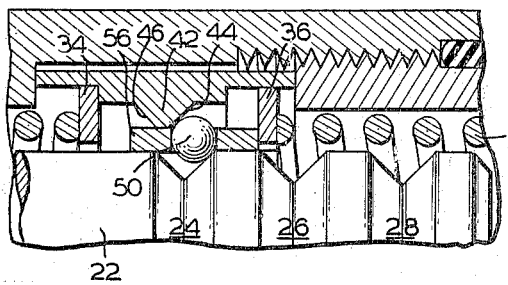

At FIG. 6 of the drawings, continued motion to the right of control shaft 22 brings groove 24 into contact with ball 50, with the latter now beginning its descent into groove 24, whereby almost a complete cycle has been effected.

It will be seen that the compressed spring 32 aids in positioning of the balls 50 in the next groove 24 together with the cam sloping surfaces of the element 42 and the sloping surfaces of the groove 24.

If the shaft 22 is moved in the opposite direction spring 30 is the spring that is compressed by the cooperative camming action of the balls and the sloping faces of the detent grooves.

It will be particularly noted that spring 32 is wholly independent of spring 30 and each spring functions only when the shaft 22 is moved in a direction toward that spring.

With this arrangement of parts springs 30 and 32 may have different compressive forces whereby the force required to move the shaft 22 in one direction may differ from the force required to move the shaft in the opposite direction. Further, it will be seen that to vary or reverse the force required to move the shaft may be very simply accomplished by changing or interchanging the springs while all of the other components of the device are maintained the same.

From the foregoing discussion it will be seen that this invention provides a very versatile and changeable detent assembly which has long service life as the balls 50 have primarily only rolling contact with their operating cam surfaces.

This feature of the form of the invention shown in FIGS. 1 through 6 may also be employed in conjunction with a rotating shaft as illustrated in FIGS. 7 through 12 of the application.

Referring now to FIGS. 7–12, inclusive, a second embodiment of the invention is illustrated which is applicable to shafts having rotating displacements and wherein it is desired to discretely position the shaft in one of a plurality of angular positions. Such a detent mechanism exhibits a wide variety of utilities and is useful, for example, in selector controls for tone and band changing, etc., in radio receivers.

Referring now to FIGS. 7–12 of the drawings, the assembly includes a rotary shaft 60 having an integral disc 62 thereon. The disc 62 is provided with a plurality of equiangularly disposed depressions or recesses 64 on its left face. The numeral 66 denotes a ball positioned in each recess 64. The numeral 68 denotes a second disc having a central aperture 70 therethrough rotatably receiving shaft 60. The numeral 72 denotes any one of a plurality of angularly disposed apertures in disc 68 of a diameter at least as great as the diameter of each ball 66. A plate 74 fixed against rotation with respect to the shaft 60 has one face provided with a plurality of nodules 78 rising from the right face of plate 74 and having generally flat tops 80 which contact the balls 66 when the balls 66 are received in the recesses 64 in disc 62. Each nodule has cam or ramp portions 79a and 79b. The assembly includes another plate 81 which is apertured to receive shaft 60 and is secured through a bight portion 82 to plate 74 to thus form the housing 76.

The upper ends of plates 74 and 81 are slotted as at 84, which slots receive parallel pins 86. The pins are maintained in the slots by a pair of springs 88 secured across each of the ends of the pins. A lug 90 preferably integral with disc 68 extends upwardly as shown in FIG. 8 and is positioned between pins 86 and abutted thereby with the force of springs 88 urging pins 86 together.

Upon rotation of shaft 60 in either direction, it will be seen that the recesses 64 carry balls 66 therewith and the latter impart this same rotation to disc 68. Angular movement of disc 68 is resisted by the force of springs 88 acting on lug 90. With continued angular movement, the balls 66 are no longer abutted by the flat portions 80 of nodules 78, and the balls move down one of the cam or ramp portions 79a or 79b and become free of the recesses in disc 62. The disc 62 now rotates relative to disc 68 with the portions of the left face of disc 62 which lie between the recesses 64 turning against the balls 66 and imparting rotation thereto. This is illustrated at FIG. 11.

When the next detent position is reached, actually the shaft 60 must go a little beyond the next detent position, the tension force of springs 88 acting against lug 90 and hence disc 68 will force the balls 66 up into the pockets 64 as the balls are forced up the ramps of the nodules 78. This is illustrated at FIG. 12 of the drawings, with the recess corresponding to the "next" detent position denoted by 64a. After the balls are forced along the ramp 79a or 79b, the spring force on lug 90 maintains the disc 69 and shaft 60 in the new detent position. It will be observed from a consideration of FIG. 12 that after the spring force has urged ball 66 along ramp 79a into recess 64a, so that the aperture 72 and recess 64a are aligned (as at FIG. 10), the spring force will cause disc 62 and hence shaft 60 to rotate slightly counter to the original direction of rotation, bringing the shaft into the new detent position.

From the foregoing discussion it will be seen that while this form of the invention is most suitable for positioning a shaft in equal increments of a circle, the device is not so restricted. Further, while only one ball is necessary for the proper operation of the mechanism, plural balls lower the forces on the balls and render the operation of the mechanism more stable and mechanically balanced.

I claim:
1. A detent mechanism including: an element movable into a plurality of positions, a recess in said element, a ball having a portion selectively positionable in said recess, an apertured element having said ball received in the aperture thereof, a member having a projection thereon, the said projection engaging said ball through the said aperture, and means yieldingly opposing motion of said apertured element.

2. The mechanism of claim 1 wherein said apertured element is a sleeve and wherein said projection carrying member is an annulus about said sleeve, the ends of the said sleeve being abutted by said yieldable means.

3. The mechanism of claim 1 wherein said apertured element is a disc and wherein said projection carrying member is an axially spaced plate, the said disc having a portion being abutted by said yieldable means.

4. A rotary shaft and detent mechanism for positioning a shaft at discrete angular positions, including: a shaft, a first disc non-rotatably secured to said shaft, said first disc being provided at one radial face thereof with a plurality of angularly spaced depressions, said depressions lying at equal radial distances from the axis of said shaft, a ball partially lying within each said depression, a second disc positioned on said shaft and relatively rotatable thereto, said second disc having a plurality of apertures therein whose angular and radial spacings correspond to the said depressions on the first disc, a plate, said shaft rotatably journaled in said plate, said plate being axially fixed with respect to said shaft, one face of said plate having a plurality of raised nodules whose radial and angular dispositions correspond to said depressions in the said first disc, the ends of said raised nodules engaging said balls, and means for yieldingly opposing angular displacement of said second disc with respect to said plate upon rotation of said shaft relative to said plate.

5. The mechanism of claim 4 wherein said yieldable means includes a lug carried by said second disc, said lug being resiliently biased by a spring carried by said plate into a fixed angular position with respect to said plate.

6. The mechanism of claim 4 wherein the ends of said nodules are flat and radially elongated, and inclined ramp portions radially elongated connecting the said flat ends of the nodules to one surface of said plate.

7. The mechanism of claim 4 wherein the axial distance between those portions of the said one face of said plate which lie between the said nodules and the surface of said second plate which faces said plate is at least as great as the diameter of said balls.

8. A detent mechanism including: a shaft axially movable in both directions and adapted to assume one of a discrete plurality of axial positions, a plurality of annular grooves, each said groove being generally V-shaped, axially spaced along said shaft, a plurality of ball elements angularly disposed in one of said annular grooves, a sleeve having a plurality of angularly disposed apertures therein with each aperture receiving a portion of one of said balls, a second sleeve, said second sleeve being axially fixed with respect to said shaft, said second sleeve having a continuous internal rib, inclined ramp portions connecting the radially innermost portion of said rib with an interior surface of said sleeve, said ramp portions beng continuous, and means resliently biasing said first sleeve to assume a fixed axial position with respect to said shaft.

9. The detent mechanism of claim 8 wherein the radial distance between the said land portions of said shaft which lie between said annular grooves and the internal surfaces of said second sleeve adjacent said ramp portions thereof is at least as great as the diameter of said balls.

10. The detent mechanism of claim 8 wherein said ramp portions of said rib are pairwise parallel with the sides of said V-shaped annular grooves.

11. The detent mechanism of claim 8 wherein said resilient biasing means comprises two springs, one end of each acting on opposite sides of said first sleeve.

References Cited by the Examiner
UNITED STATES PATENTS

| | | | |
|---|---|---|---|
| 2,775,137 | 12/1956 | Chung | 74—527 |
| 3,096,665 | 7/1963 | Cappelle et al. | 74—527 |
| 3,218,882 | 11/1965 | Stephens et al. | 74—527 |

FRED C. MATTERN, Jr., *Primary Examiner.*

J. PUFFER, *Assistant Examiner.*